UNITED STATES PATENT OFFICE.

ERNST UTESCHER, OF HAMBURG, GERMANY.

PROCESS FOR SATURATING UNSATURATED FATTY ACIDS AND THEIR GLYCERIDS BY COMBINING THEM WITH HYDROGEN.

1,124,560.   Specification of Letters Patent.   Patented Jan. 12, 1915.

No Drawing.   Application filed February 10, 1913.   Serial No. 747,519.

*To all whom it may concern:*

Be it known that I, ERNST UTESCHER, a subject of the King of Prussia, residing at Hamburg, in the State of Hamburg, German Empire, have invented certain new and useful Improvements in an Improved Process for Saturating Unsaturated Fatty Acids and Their Glycerids by Combining Them with Hydrogen, of which the following is a specification.

This invention relates to an improved process for saturating unsaturated fatty acids and their glycerids by combining them with hydrogen.

It has already been proposed before to render fish or train oil odorless by subjecting the oil, which is maintained in motion to the action of silent electrical discharges in the presence of hydrogen. By this means the fish or train oil is at the same time hardened, as the glycerids of unsaturated fatty acids are saturated by combining with hydrogen, and as particularly the glycerids of oleic acid are partly converted into glycerids of stearic acid. Further it has been proposed before to convert unsaturated fatty acids or their glycerids into saturated compounds, by treating the fatty substances with hydrogen in the presence of a finely divided contact metal or catalytic agent, such as finely divided nickel or finely divided platinum metals.

Object of this invention is to combine these two processes.

According to this invention the silent electrical discharge is chiefly used for maintaining the catalytic or contact substance permanently active and for considerably increasing the activity of the same. The fatty substances are either mixed with the finely divided catalytic agent or contact substance and are then exposed in the usual manner, in the form of a thin layer to the action of silent electrical discharges in suitable apparatus, or plates of the contact metal or contact substance are arranged in a suitable manner in the apparatus, in which the silent electrical discharges take place. The rays of the silent electrical discharges are preferably allowed to impinge the surface of the contact substance or catalytic agent.

In carrying into effect the improved process apparatus of the type in which the discharge itself is prevented from coming into direct contact with the fatty substances, so that solely the chemically active rays of the silent discharge come into action may be employed: for instance the well known mercury lamp may be used. The rays from such a source are similarly allowed to impinge on the surface of the contact substance. By means of this combined process, it is possible to effect an easy combination with the hydrogen, while the combined effect exceeds the effect of the total of the two combination elements. The improved process, most important of all, renders it possible to rapidly effect the saturation of the unsaturated fatty acids and their glycerids, also without mixing finely divided contact metal therewith, so that the expense incurred by the recovery of the contact metal from the oil and by the regeneration of the contact substance is saved. When using metal plates in carrying out the improved process it is sufficient to heat the plates from time to time. The new process may also be carried into effect by coating the glass tubes in which the silent discharge takes place with a thin layer of contact metal and further by arranging plates of contact metal in a suitable manner in the reaction space or chamber.

With a suitable arrangement of the apparatus the action of the electric rays on the metals may be so lasting that the same retain an increase activity even after the treatment. This renders it possible to also carry the improved process into effect, by first of all subjecting the metal to the action of electric rays and by using the thus prepared metal as contact substance during the treatment of the oil with hydrogen.

In order to render the metal active the same is subjected to a cathode atomization process in an atmosphere of hydrogen, the method of procedure being as follows: The metal plate which is to serve as contact substance or catalytic agent is used as cathode for the atomization and is placed in a vessel of suitable size and of suitable material. This vessel, if required, may be evacuated. A pin of suitable metal is used as anode. For the purpose of carrying out the treatment the chamber is first of all evacuated, whereupon hydrogen which has previously been carefully dried is introduced. The electric current is then passed through while at the same time a continuous slow stream of hydrogen traverses the apparatus. During the evacuation care must be taken that no traces of oil or fat vapor penetrate into the vessel, as otherwise the same would deposit themselves on the metal and thus prevent an atomizing of the same. As by this treatment a high chemical activity is imparted to the metal, air must not be allowed to enter the vessel immediately after the completion of the atomizing process as this might easily cause oxy-hydrogen gas explosions. On the contrary the hydrogen must first of all be displaced by nitrogen. The thus treated cathodes are eminently suitable as contact substances or catalytic agent for the hydration. As soon as the activity of the metal has disappeared the same need only be subjected to a renewed treatment in a manner described hereinbefore after having burnt off the fat.

I claim:

1. An improved process for saturating unsaturated fatty acids and their glycerids by combining them with hydrogen which consists in subjecting the oil to the action of hydrogen, using at the same time a metal acting as contact substance or catalytic agent, and silent electrical discharges, substantially as hereinbefore described.

2. An improved process for saturating unsaturated fatty acids and their glycerids by combining them with hydrogen which consists in subjecting the oil with large surface exposure to the action of hydrogen, using at the same time a metal acting as contact substance or catalytic agent, and silent electrical discharges.

In testimony whereof I affix my signature in presence of two witnesses.

E. UTESCHER.

Witnesses:
   ERNEST H. L. MUMMENHOFF,
   IDA CHRIST. HAFERMANN.